US011257006B1

(12) United States Patent
Anschel et al.

(10) Patent No.: US 11,257,006 B1
(45) Date of Patent: Feb. 22, 2022

(54) AUTO-ANNOTATION TECHNIQUES FOR TEXT LOCALIZATION

(71) Applicant: Amazon Technologies, Inc., Seattle, WA (US)

(72) Inventors: Oron Anschel, Haifa (IL); Amit Adam, Haifa (IL); Shahar Tsiper, Haifa (IL); Hadar Averbuch Elor, Ra'anana (IL); Shai Mazor, Binyamina (IL); Rahul Bhotika, Bellevue, WA (US); Stefano Soatto, Pasadena, CA (US)

(73) Assignee: Amazon Technologies, Inc., Seattle, WA (US)

( * ) Notice: Subject to any disclaimer, the term of this patent is extended or adjusted under 35 U.S.C. 154(b) by 433 days.

(21) Appl. No.: 16/196,662

(22) Filed: Nov. 20, 2018

(51) Int. Cl.
*G06N 20/00* (2019.01)
*G06K 9/00* (2006.01)
*G06F 40/169* (2020.01)

(52) U.S. Cl.
CPC .......... *G06N 20/00* (2019.01); *G06F 40/169* (2020.01); *G06K 9/00463* (2013.01); *G06K 9/00469* (2013.01)

(58) Field of Classification Search
CPC .. G06N 20/00; G06F 40/169; G06K 9/00463; G06K 9/00469
USPC .......................................................... 706/12
See application file for complete search history.

(56) References Cited

U.S. PATENT DOCUMENTS

| | | | |
|---|---|---|---|
| 5,140,650 A * | 8/1992 | Casey ................ | G06K 9/00449 382/283 |
| 9,348,920 B1 | 5/2016 | Kesin | |
| 9,384,405 B2 * | 7/2016 | Choi ...................... | G09G 5/373 |
| 9,477,777 B2 | 10/2016 | Stankiewicz | |
| 9,485,265 B1 | 11/2016 | Saperstein et al. | |
| 10,262,432 B1 * | 4/2019 | Keilholz ................... | G06T 7/62 |
| 10,318,630 B1 | 6/2019 | Kesin et al. | |
| 10,410,136 B2 | 9/2019 | Zhang et al. | |
| 10,437,837 B2 | 10/2019 | Wang et al. | |

(Continued)

FOREIGN PATENT DOCUMENTS

JP 5651221 B2 * 1/2015

OTHER PUBLICATIONS

Lerman, Kristina et al.; "Using the Structure of Web Sites for Automatic Segmentation of Tables" SIGMOD 2004 Proceedings of the ACM SIGMOD International Conference on Management Data, France, Jun. 13-18, 2004; New York, NY:ACM, US, Jun. 13, 2004, pp. 119-130.

(Continued)

*Primary Examiner* — Stephen S Hong
*Assistant Examiner* — Broderick C Anderson
(74) *Attorney, Agent, or Firm* — Nicholson De Vos Webster & Elliott, LLP

(57) ABSTRACT

Techniques for auto-generation of annotated real-world training data are described. An electronic document is analyzed to determine text represented in the document and corresponding locations of the text. A representation of the electronic document is modified to include markers and printed. The printed document is photographed in real-world environments, and the markers within the digital photographs are analyzed to allow for the depiction of the document within the photographs to be rectified. The text and location data are used to annotate the rectified images.

20 Claims, 9 Drawing Sheets

(56) References Cited

U.S. PATENT DOCUMENTS

| | | | |
|---|---|---|---|
| 10,440,197 B2 * | 10/2019 | Horvath | H04N 1/32106 |
| 10,452,651 B1 | 10/2019 | Palou | |
| 10,791,272 B1 * | 9/2020 | Kunjachan | G06K 9/2063 |
| 2005/0065975 A1 | 3/2005 | McDonald | |
| 2005/0182736 A1 * | 8/2005 | Castellanos | G06F 40/295 |
| | | | 705/80 |
| 2006/0242567 A1 * | 10/2006 | Rowson | G06F 16/50 |
| | | | 715/209 |
| 2007/0061755 A1 | 3/2007 | Taboada et al. | |
| 2007/0168382 A1 * | 7/2007 | Tillberg | G06K 9/00449 |
| 2011/0099133 A1 | 4/2011 | Chang et al. | |
| 2015/0032645 A1 * | 1/2015 | Mckeown | G06Q 50/18 |
| | | | 705/311 |
| 2016/0036460 A1 | 12/2016 | Sengupta et al. | |
| 2016/0364608 A1 * | 12/2016 | Sengupta | G06F 16/345 |
| 2018/0025251 A1 * | 1/2018 | Welinder | G06F 40/123 |
| | | | 382/199 |
| 2019/0311301 A1 | 10/2019 | Vikram | |
| 2020/0074169 A1 | 3/2020 | Mukhopadhyay et al. | |
| 2020/0089942 A1 * | 3/2020 | Man | G06N 20/00 |

OTHER PUBLICATIONS

International Search Report and Written Opinion for International Application No. PCT/US2019/062541, dated Mar. 12, 2020, 16 pages.

Non-Final Office Action, U.S. Appl. No. 16/198,040, dated Jul. 20, 2020, 10 pages.

Non-Final Office Action, U.S. Appl. No. 16/147,018, May 1, 2020.

Notice of Allowance, U.S. Appl. No. 16/147,018, Aug. 26, 2020, 8 pages.

Notice of Allowability, U.S. Appl. No. 16/198,040, Nov. 4, 2020, 7 pages.

\* cited by examiner

AUTO-ANNOTATION TECHNIQUES FOR TEXT LOCALIZATION

BACKGROUND

The field of machine learning has become widely acknowledged as a likely significant driver of the future of technology. Organizations everywhere now seek to use machine learning techniques to address a wide variety of problems, such as optimizing aspects of their products, processes, customer experience, etc. While the high-level view of machine learning sounds simple—e.g., provide training data to a computer, to allow the computer to automatically learn from the training data to generate a model that can make predictions for other data—implementing machine learning techniques in practice can be tremendously difficult.

This difficulty is partially due to the underlying algorithmic and mathematical complexities of machine learning algorithms, which are typically developed by academic researchers or individuals at the forefront of the field. Additionally, it is also difficult to generate, update, and deploy useful models, which can be extremely time and resource consumptive and filled with complexities. Moreover, machine learning models tend to be extremely focused on particular use cases and operating environments, and thus any change to the underlying environment or use case may require a complete regeneration of a new model.

BRIEF DESCRIPTION OF DRAWINGS

Various embodiments in accordance with the present disclosure will be described with reference to the drawings, in which.

DETAILED DESCRIPTION

Figure 1:
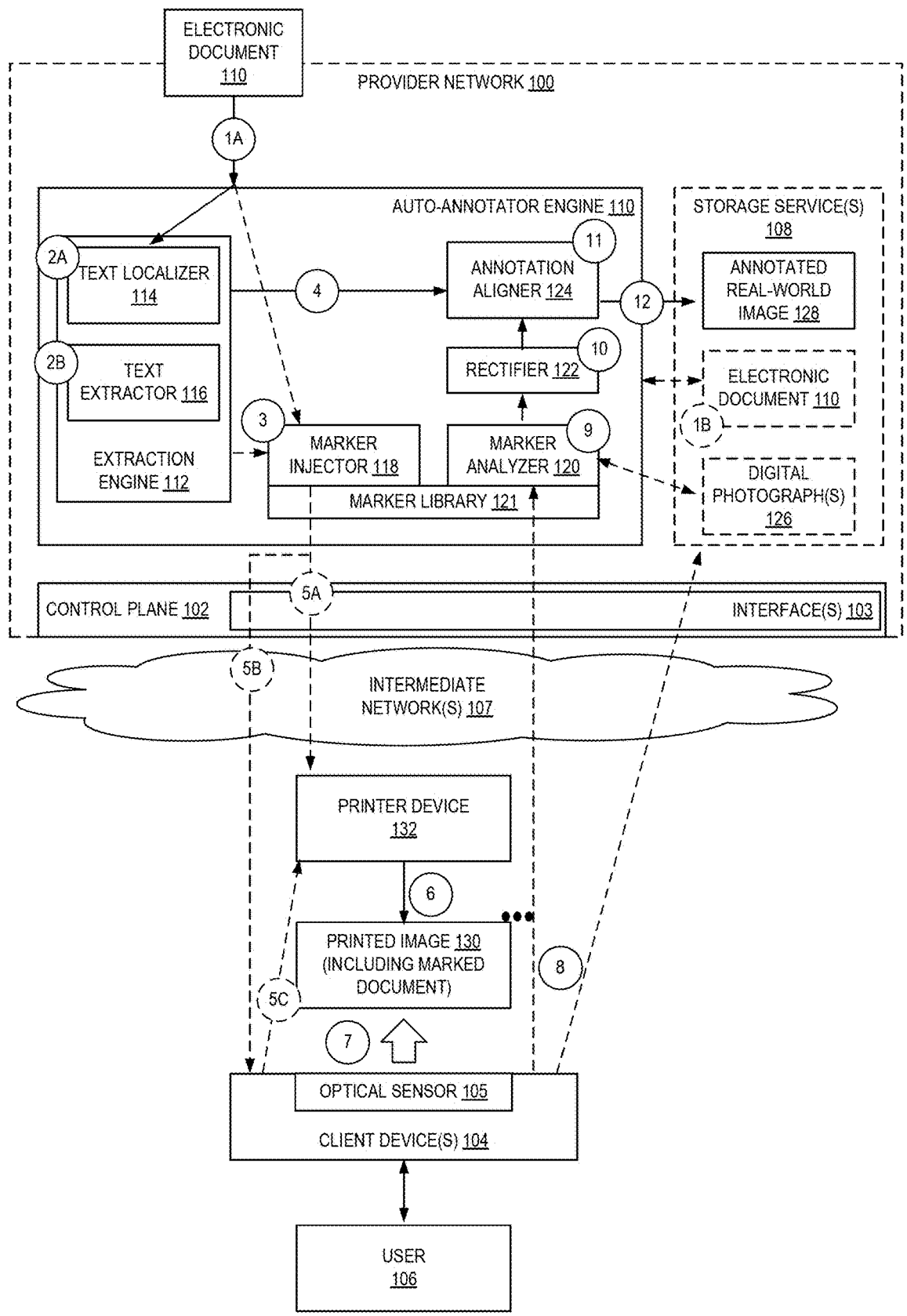
FIG. 1 is a diagram illustrating an environment for auto-generation of annotated real-world training data according to some embodiments.

Various embodiments of methods, apparatus, systems, and non-transitory computer-readable storage media for the auto-generation of annotated real-world training data are described. According to some embodiments, an auto-annotator engine is provided that can automatically annotate real-world data for use in training machine learning (ML) models. In machine learning, having a sufficient amount of real-world annotated data is one of the key factors needed for successfully training a model. For example, if there is a need to train a model to detect an animal such as a cat or horse in an image, someone needs to label the image with identifiers of cat or horse, typically along with location information identifying where in the image that particular animal is. This labeling is done by people referred to as annotators, who manually label images or other types of data to be used for training models. However, such human annotations of data (e.g., identifying and transcribing text, along with associated location information, for each of a very large number of data elements) takes a long time and is extremely prone to errors, resulting in a long process for generating a model, only to generate a model of poor quality due to being trained on erroneous or low-quality annotated data.

To implement a document or form processing service, numerous types of ML models may be utilized to analyze digital documents. For example, a ML model may be employed to seek to identify where text is represented in an image of a document, and extract/identify what that text is. Thus, to train such a model, an extremely large amount of training data in the form of annotated images of documents needs to be generated, which is tremendously cumbersome for humans to perform as indicated above.

Further, images taken in real-world settings suffer from various artifacts resulting from how the image was captured. For example, different cameras or settings will lead to differences in lighting, shadows, angles, camera optical sensor issues, image compression levels and techniques, zoom levels, etc. Further, some warping of the images is often present due to the document not being laid perfectly flat or having other physical defects. Handling as many potential deviations as possible is very important for crafting a good machine learning model, and thus, it is extremely important to train such a model using data that is truly similar to what the actual data (provided for inference) will look like—e.g., image captures by cellphone cameras taken in imprecise and varied conditions.

Embodiments disclosed herein can generate automatically-annotated "real world" generated images of documents in an automated manner, which can be used as particularly high-quality data for training a ML model. The images of documents may be captured under various real-world conditions, such as outside, at a desk, in a car, etc., with differing lighting conditions, differing perspectives (e.g., slanted, upside down, etc.), etc., and then annotated to allow a ML model to be trained using real-world type training data so that it can handle similar types of real world inputs (e.g., accommodate artifacts added by camera-phones, oddities resulting from human activity such as low quality captures of documents, etc.) that may be provided for text detection and/or localization. Accordingly, machine learning models can be generated much faster, with potentially more and better-quality training data, resulting in improved performance of these models.

FIG. 1 is a diagram illustrating an environment for auto-generation of annotated real-world training data according to some embodiments. This environment includes an auto-annotator engine 110 that automatically generates annotations of electronic documents captured in real world conditions. The auto-annotator engine 110 is primarily implemented using software, though in other embodiments it could be implemented in hardware or a combination of both hardware and software. In many embodiments, such as when the auto-annotator engine 110 is implemented as a component or service within a provider network 100 and needs to operate in large scale to process substantial numbers of requests, the auto-annotator engine 110 may be implemented in a distributed manner—e.g., using multiple computing devices in a same or different geographic location.

A provider network 100 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 107 (e.g., the internet) via one or more interface(s) 103, such as through use of application programming interface (API) calls, via a console implemented as a website or application, etc. The interface(s) 103 may be part of, or serve as a front-end to, a control plane 102 of the provider network 100 that includes "backend" services supporting and enabling the services that may be more directly offered to customers.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks, or may indirectly utilize a compute instance by submitting code to be executed by the provider network, which in turn utilizes a compute instance to execute the code (typically without the user having any control of or knowledge of the underlying compute instance(s) involved).

As indicated above, the auto-annotator engine 110 in some embodiments is implemented in software, and includes a number of sub-components that may also be implemented in whole or in part using software—an extraction engine 112 including a text localizer 114 component and a text extractor 116 component, a marker injector 118, a marker analyzer 120, a rectifier 122, and an annotation aligner 124.

The auto-annotator engine 110, at circle (1A), obtains an electronic document 110. The electronic document 110 may be a digital file storing a representation of a document such as a form. For example, the electronic document 110 may be a Portable Document Format (PDF) file, a word processing document such as a Word™ document or Open Document Format (ODF) file, an image including a representation of a document (e.g., a JPG, GIF, PNG), etc. The auto-annotator engine 110 may obtain the electronic document 110 by, for example, receiving a message (e.g., a HyperText Transfer Protocol (HTTP) request) carrying the document or identifying a location of the document, reading the electronic document 110 from a storage location at circle (1B) (e.g., a storage service 108 within or outside of provider network 100), etc.

At circle (2A), the text localizer 114 of an extraction engine 112 may operate upon the electronic document 110 to identify locations of text within the document. The text localizer 114 may comprise, for example, an object detection machine learning model trained to identify characters, words, lines of text, paragraphs, etc., as is known to those of skill in the art. The text localizer 114 can identify the locations of the text in the form of polygons (e.g., bounding boxes), coordinates, etc.

The text extractor 116 at circle (2B) may identify the text within the electronic document 110. This identification may include using the locations identified by the text localizer 114, which may include performing an optical character recognition (OCR) process upon these locations.

However, in some embodiments the extraction engine 112 may utilize these components in different ways to achieve the same result. For example, the electronic document 110 may be a PDF file already including the text within the document (instead of just carrying a "flat" image alone), and the text extractor 116 may identify this text, while the text localizer 114 identifies the locations of that text.

Optionally, the extraction engine 112 may convert the electronic document 110 into a pure image file such as a PNG or JPG and provide this image file at circle (3) to a marker injector 118. Alternatively, the extraction engine 112 may simply pass on the electronic document 110 without converting it, or the originally-received electronic document 110 may instead be provided directly to the marker injector 118 by the auto-annotator engine 110. The extraction engine 112 may also, at circle (4) provide the text and location information to an annotation aligner 124 for later use as described herein with regard to circle (11).

The marker injector 118 (and marker analyzer 120) may operate using a marker library 121, such as the ArUco library, which is a well-known library for detection of square fiducial markers. The library may be code (e.g., functions or code libraries) for creating markers, or simply a collection of previously-generated markers to be utilized. Binary square fiducial markers provide a benefit in that even a single marker provides enough correspondences (e.g., its four corners) to obtain the camera pose. Further, the inner binary codification of ArUco markers makes them especially robust, allowing the possibility of applying error detection and correction techniques. However, the marker library 121 may also be a library for encoding and/or decoding different types of markers, such as QR codes, barcodes, or similar.

The marker injector 118 may operate upon the image by inserting or embedding one or more markers, such as ArUco markers, into the image. The marker injector 118 may insert markers according to a variety of schemes, such as placing a marker at each of the four corners of the document (or at each corner, but with a margin applied), only at one of the corners, at two corners, at one or more corners and/or midpoints between corners, etc. Alternatively, the marker injector 118 may place multiple markers on one or more—or each—of the four borders of the image.

In some embodiments, the markers are specially placed to avoid obscuring any of the text in the image. For example, some embodiments may line the borders of the image with many (e.g., two, more than four in total, etc.) markers. The use of many markers can enable the system to account for deformations (e.g., folds, indentations, etc.) in an image. For example, by analyzing the image to detect the markers, the system can take into account the entire space of markers and use them to rectify the document.

One or more of the markers may be generated to encode a value that can later be analyzed and thus, decoded to reveal that value (e.g., using a dictionary of codes). In some embodiments, the markers are generated and placed specially such that an analysis of the markers reveals a "true" orientation of the image, identifies the edges of the document, provides an identifier of the document itself, etc. For example, a marker placed at the top-left of the image may be unique so that it can be identified as being attached to the top-left of the document, or all markers placed at the top border of the image can indicate that they are part of the top border. As another example, one or more of the markers may encode a unique identifier (from the perspective of the auto-annotator engine 110) of the particular document, which can be utilized later by the auto-annotator engine 110 for the purpose of matching of the document and other data associated with the document. Thus, in some embodiments, multiple "types" of markers can be used (e.g., multiple different ArUco markers) together within one image to provide various benefits, such as determining the orientation of the document, encoding different values within the markers, etc.

The marked image may then be printed via printer device 132 at circle (6) to generate a printed image 130 representing the marked document. For example, the auto-annotator engine 110 may transmit the marked image at circle (5A) to the printer device 132 (e.g., via Internet Protocol (IP) printing, a print service, etc.), transmit the marked image at circle (5B) to a client device 104 of a user 106 (e.g., via a website), which may then print the marked image using the printer device 132, etc. In some embodiments in which the auto-annotator engine 110 is implemented in a provider network 100, the printer device 132 may be located within or exterior to the provider network 100.

The user 106 may then, at circle (7), take one or more photographs of the printed image 130 using one or multiple client device(s) 104 (via an optical sensor 105 of each device). For example, the user 106 (or multiple users) may utilize as client device 104 a cellular phone or other mobile device to capture digital photographs taken of the printed image 130 in different environments. The captured digital photographs may be taken of the printed image 130 in a variety of rooms, with a variety of different backdrops, in a variety of outdoor locations, with a variety of different lighting conditions, with different orientations of the printed image 130, using different client devices 104, etc. Thus, a variety of types of real-world artifacts may be introduced into the representations of the document within the image, such as artifacts generated by particular cellular phone cameras, shadows, lighting issues, distortions or other malformations due to the printed image 130 bending or being malformed (e.g., ripped, folded, warped, etc.), or other artifacts commonly introduced by people taking photographs using these types of devices in these various types of locations.

The client device 104 may then transmit, at circle (8), the one or more digital photographs to the auto-annotator engine 110 (which may optionally store the digital photographs 126 in a storage location) or directly to a storage location (e.g., within a folder or bucket provided by a storage service 108).

At circle (9), the marker analyzer 120 may utilize a marker library 121 of code to analyze the markers present in the photograph(s) 126. The marker analyzer 120 may analyze the image to detect the presence of the markers, determine the orientation of the document within the image, detect the identifier of the document, etc. The marker analyzer 120 can provide this orientation information to a rectifier 122, which at circle (10) performs image transformation techniques (e.g., mathematical transformations such as homography transformation techniques) with the digital photograph(s) 126 based on the orientation information to "rectify" the document(s) depicted therein (e.g., make the top of the document be located at the top of the image, make the top of the document horizontal, crop out the background of the image, and so on). For example, in some embodiments the rectifier 122 may perform wrinkle correction (e.g., via detection of a misalignment of one or more markers) using techniques known to those of skill in the art to remove the existence of wrinkles/creases appearing in the representation of the document.

Although embodiments disclosed herein can work with images having only one (or a few) embedded markers, in some embodiments a large number of markers—i.e., more than four—are utilized, which allows for extremely high-quality rectification by the rectifier 122, as it can account for malformations occurring throughout the image, such as wrinkles, warping, etc. As even small improvements in the rectification can produce higher-quality data (and ultimately, higher-quality training data in the form of annotated real-world images 128), the resulting model can be significantly better at accommodating various real-world artifacts or malformations that may be present.

The rectified image(s) may be passed to an annotation aligner 124 which, at circle (11), annotates the rectified image with the text originally extracted by text extractor 116 based on the locations of the text identified by the text localizer 114. For example, the marker analyzer 120 may determine a unique identifier of the document (which may be encoded using one or more markers) and provide this unique identifier directly or indirectly (e.g., via rectifier 122) to the annotation aligner 124. The annotation aligner 124 may use this unique identifier to look up or query the text and location data for the document, e.g., from a storage service 108, from the extraction engine 112, etc. The annotation aligner 124 can then associate the text with those corresponding locations on the rectified image based on the location data, resulting in an annotated real-world image 128, which is stored at circle (12). These annotated real-world images 128 can then be used, for example, as training data for a machine learning engine that trains a machine learning model to recognize text within images that were captured by users in the "real world," such as via cellphones. As an additional example, the annotated real-world images 128 can be used to train a rectifier 122 (as described later herein), used in benchmarking existing ML engines, or in another setting where annotated data can be useful.

Figure 2:
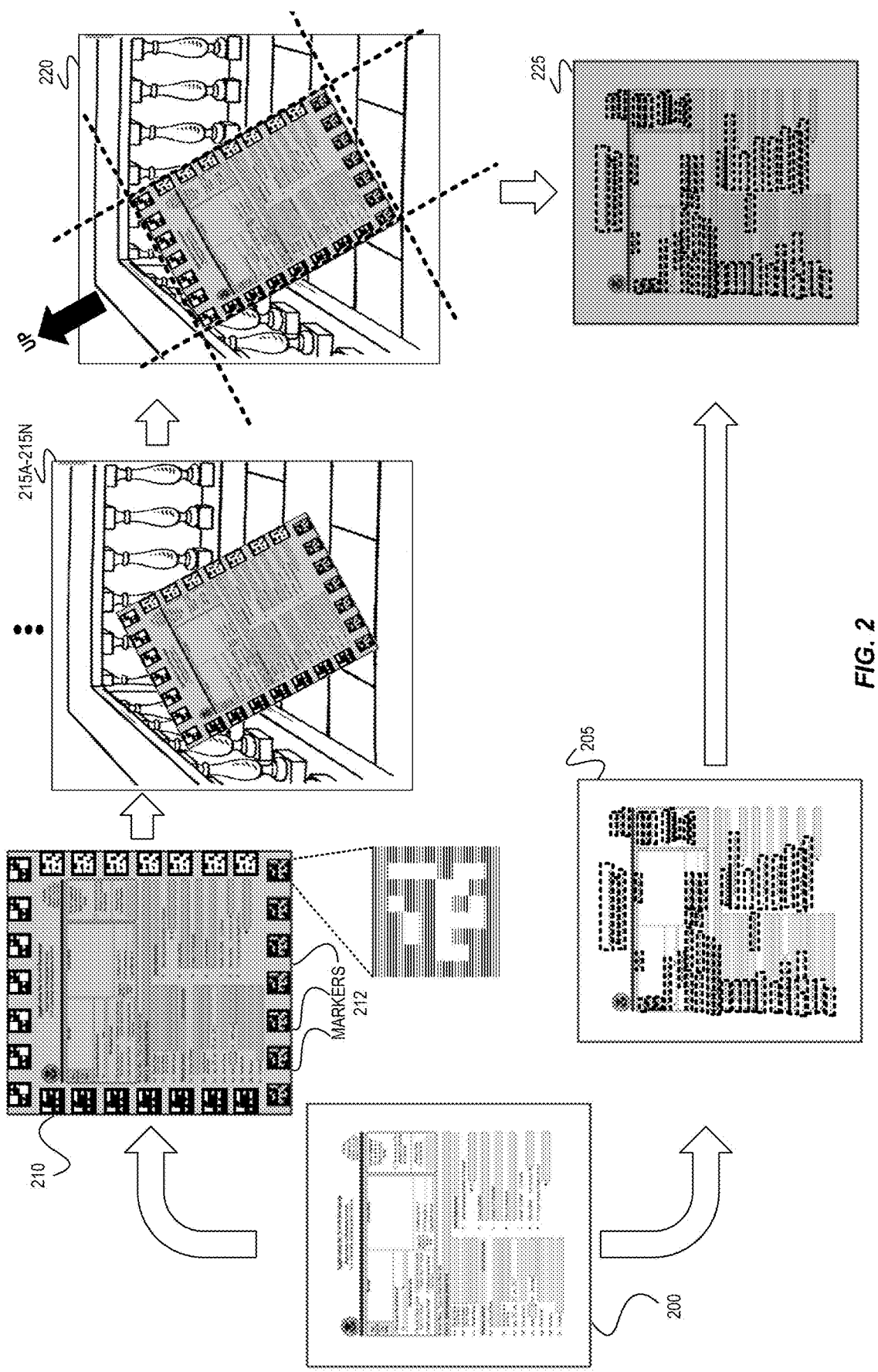
FIG. 2 is a diagram illustrating exemplary high-level operations for the auto-generation of annotated real-world document captures for use as training data according to some embodiments.

For further detail and ease of understanding, FIG. 2 is a diagram illustrating exemplary high-level operations for the auto-generation of annotated real-world document captures for use as training data according to some embodiments. On the left-hand side, an electronic document 200 (equivalent to electronic document 110) such as a PDF is shown that represents a form including many different portions of text. The electronic document 200 may be thought of as being processed according to two paths.

The bottom path shows the electronic document 200 with extracted text and location data (represented as annotated image 205 with polygons such as bounding boxes over the locations at which the text is). Moving from electronic document 200 to annotated image 205 may be performed, for example, by the extraction engine 112 of FIG. 1.

The top path includes a set of operations involving taking one or more pictures of the electronic document 200 in the "wild" to introduce artifacts, rectify these images back to "normal," and attach the ground truth annotations (from the bottom path) to indicate what is represented in the rectified images.

For example, in moving from electronic document 200 to marked image 210, the electronic document 200 may optionally have been converted into an image and a plurality of markers 212 were embedded into the image. These operations may be performed, for example, by the extraction engine 112 (e.g., for file type conversion into an image) and/or by the marker injector 118 of FIG. 1.

To move from the marked image 210 to real-world captured images 215A-215N (equivalent to digital photographs 126, represented here with the document as having been rotated, darkened, and located in front of a patio or fence), the marked image 210 may be printed by a printer device 132 into one or more printed images 130, which are captured by one or more client devices 104.

The real-world captured images 215A-215N can then be analyzed (e.g., by the marker analyzer 120 of FIG. 1) to detect how the document has been skewed or otherwise transformed (e.g., ripped, angled, etc.) within the image, detect the "true" top of the document (as shown by the black arrow labeled UP), detect an identifier of the document, etc.

This information and the image(s) can be used, along with the high-quality text and location data generated on the bottom path, to create a rectified, annotated real-world image 225 (equivalent to annotated real-world image 128 of FIG. 1), which may have been performed by the rectifier 122 and annotation aligner 124 of FIG. 1.

This annotated real-world image 225, with aligned locations and text, results in a "real-world" annotated document that has malformations and various issues just like real world data because it is "real" captured data, having "real world" coloring and representing real life conditions.

As indicated above, traditional ML models can handle perfectly "clean" images easily. However, if these models would be trained using only "clean" images, the model would get overfit. Then, when users submit their "real world" data, the model can't handle it—e.g., due to blurring, lighting issues, etc., the model will fail terribly. Although these variations may seem slight, they are extremely important to accommodate when training a model. Thus, training a ML model using these disclosed techniques—which can understand and tolerate noise—is far superior to training a model using "pure" synthetic images, which don't have artifacts.

The flow of operations shown in FIG. 2 can be run one time—or many times—for a same document, and likewise, these operations can be performed for many images. As a result, a ML model can be trained to handle with a wide variety of real world input data, which can provide the difference between the model failing and succeeding. Further, these techniques avoid the time-consuming and error-prone need to have people manually annotate documents.

These operations can be further specialized in other use cases. For example, if there is a need to train a ML model that is to operate on data coming from a particular source or type of source, then those types of sources (e.g., particular cellphones from a particular manufacturer, particular document scanners, etc.) can be used to capture the digital photographs 126 to thus fine-tune the eventual model. However, in some embodiments a variety of types of client devices 104 are purposefully selected to enable a model to be generalized to handle a variety of types of images from a variety of client devices from a variety of people.

Figure 3:
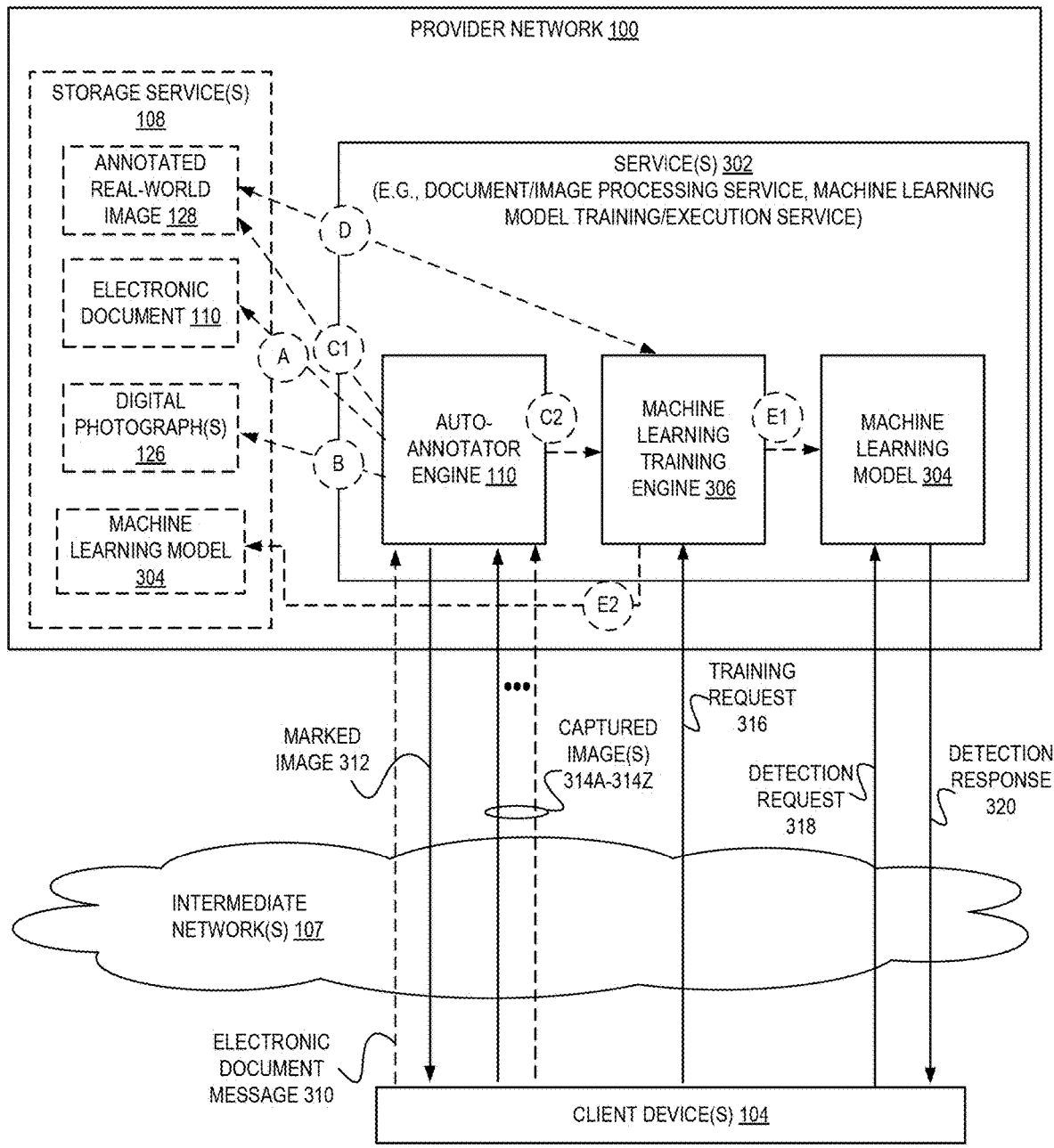
FIG. 3 is a diagram illustrating an environment for generating and utilizing auto-generated annotated real-world training data according to some embodiments.

Moving on, FIG. 3 is a diagram illustrating an environment for generating and utilizing auto-generated annotated real-world training data according to some embodiments. In this environment, the auto-annotator engine 110 is implement within one of one or more services 302 such as a document or image processing service, a machine learning service, a model training or execution service, etc. A user, via a client device 104, may optionally issue an electronic document message 310 to the auto-annotator engine 110 that includes or identifies (e.g., in storage service 108) an electronic document 110. At circle (A), the auto-annotator engine 110 may store the electronic document 110 at a storage location of storage service(s) 108, if the electronic document 110 does not already so exist. The auto-annotator engine 110 may mark up an image of the document as indicated herein and return the marked image 312 to the client devices (or printer device, etc.). Upon the user(s) printing and capturing real-world images of the marked image 312, the client device(s) 104 may transmit these digital photographs 126 back as captured images 314A-314Z to the auto-annotator engine 110, which may store the digital photographs 126 at circle (B) and/or analyze and annotate these images as described herein. The auto-annotator engine 110 may store the annotated real-world image(s) 128 in storage service(s) 108 at circle (C1) and/or provide them at circle (C2) to a machine learning training engine 306, which responsive to a training request 316 issued by the client device(s) 104 (that identifies, e.g., the annotated real-world image(s) 128 to be used as training data, among other things) can obtain (at circle (D) and/or (C2)) and utilize the annotated real-world image(s) 128 as input training data to train a machine learning model 304. The machine learning model 304 may run within the one of the one or more services 302 at circle (E1) and/or stored at circle (E2). For a particular detection request 318 that includes or identifies a new image including a representation of a document therein, the machine learning model 304 can run to identify the text and/or locations thereof, which may be returned in a detection response 320 message to the client device(s) 104.

Figure 4:
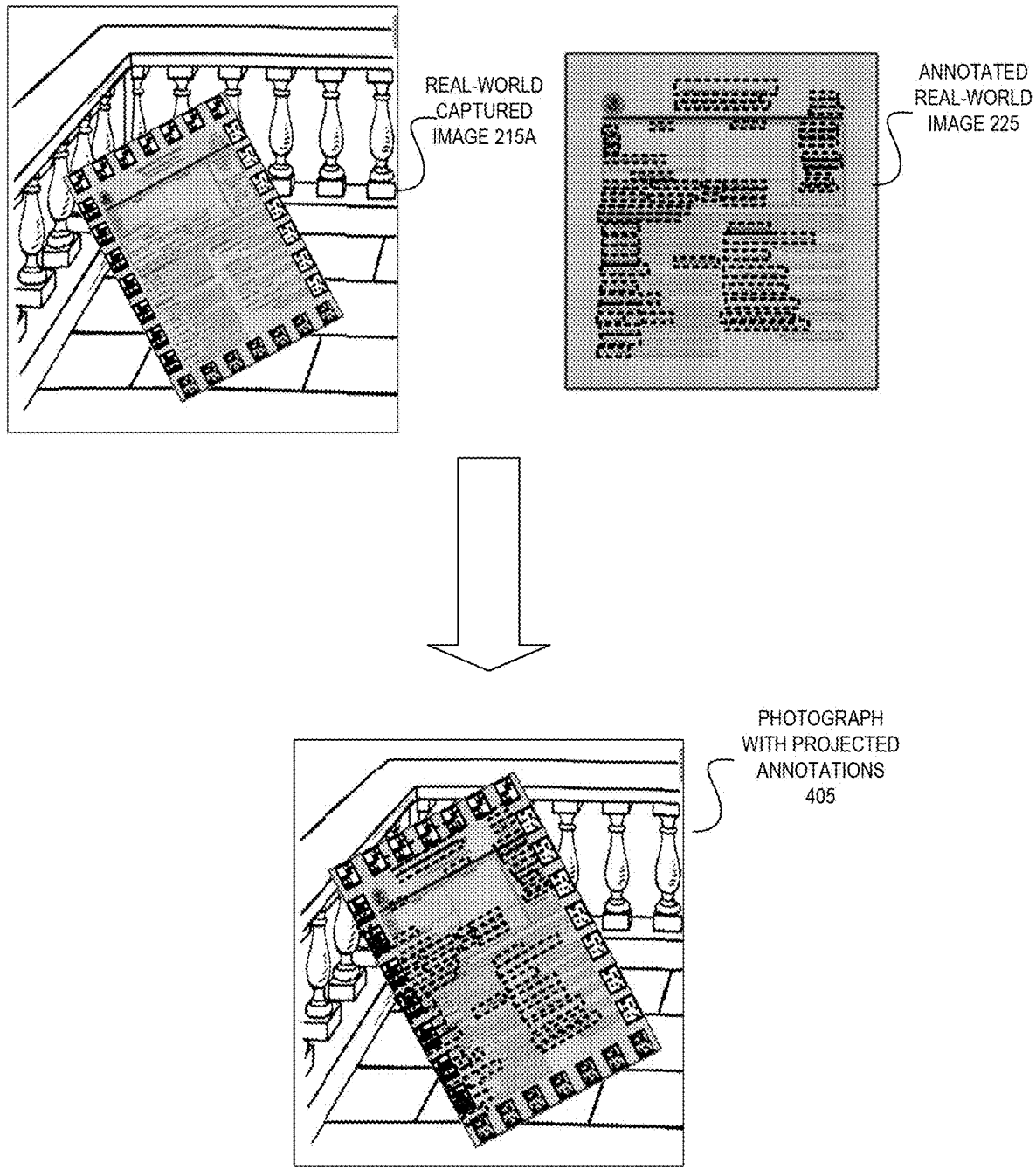
FIG. 4 is a diagram illustrating reverse projection of annotations according to some embodiments.

Embodiments disclosed herein can also provide other benefits. For example, FIG. 4 is a diagram illustrating reverse projection of annotations according to some embodiments. In some embodiments, the annotations (as shown as part of annotated real-world image 225) can be projected back onto the real-world captured image 215A using a simple mathematical inverse function (e.g., from one used during rectification), resulting in a photograph with projected annotations 405. In addition to being able to view/explore the accuracy of the annotations, this technique could be utilized to allow machine learning images to directly train using captured-in-the-wild images (without rectification). As another example, in some embodiments, by knowing the angle/positioning of the document within the image (from use of markers), the auto-annotator engine 110 can remove the markers (e.g., by smearing the image, taking colors from surrounding areas, etc.) to produce good training data for the rectifier engine to assist it in learning how to rectify images.

Figure 5:
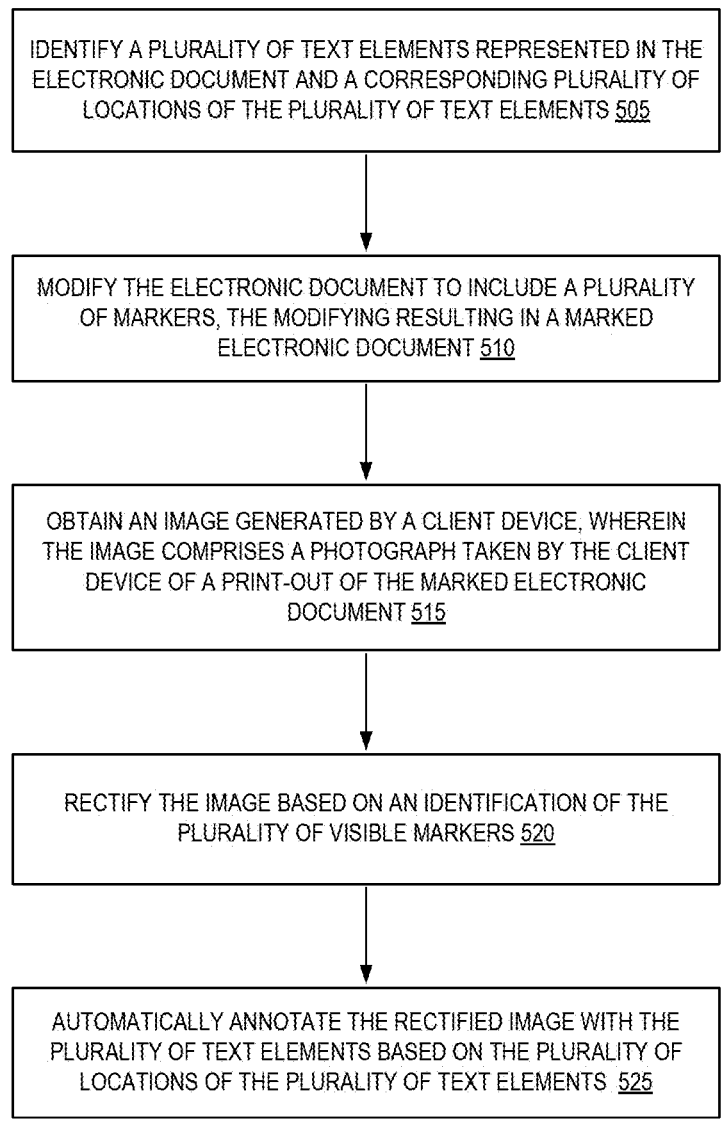
FIG. 5 is a flow diagram illustrating operations of a method for the auto-generation of annotated real-world training data according to some embodiments.

FIG. 5 is a flow diagram illustrating operations 500 of a method for the auto-generation of annotated real-world training data according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by the auto-annotator engine 110 of the other figures.

The operations 500 include, at block 505, identifying (e.g., from an electronic document) a plurality of text elements represented in the electronic document and a corresponding plurality of locations of the plurality of text elements. The electronic document may be, for example, a Portable Document Format (PDF) file including a form and/or text, an image file such as a JPEG, GIF, or PNG that includes a visual depiction of a document, a plaintext file, a Word™ document or similar, etc. Block 505 may include performing an optical character recognition (OCR) process known to those of skill in the art to identify text elements (e.g., characters, words, lines of text, paragraphs, etc.), and/or performing a word detection process (e.g., an object detection machine learning model) known to those of skill in the art to generate polygons or bounding boxes corresponding to characters, words, lines, paragraphs, etc., of text.

The operations 500 include, at block 505, modifying the electronic document to include a plurality of markers, the modifying resulting in a marked electronic document. The plurality of markers may be AruCo markers, QR codes, etc. The plurality of markers may be positioned to allow a positioning/orientation of the document to be determined from multiple different perspectives. The plurality of markers may be positioned and/or selected to allow a true "top" (or bottom, right, left, etc.) of the document to be identified through analysis of one or more of the markers. For example, markers placed along a "top" axis of the document may be specially selected (and thus, identified) to serve as identifiers of the top of the document, even if the document is rotated differently from a particular perspective. One or more of plurality of markers, individually or collectively, may be selected to encode an identifier of the electronic document, such that by viewing/analyzing one or more of the markers, the document can be identified via the identifier.

In some embodiments, each of the plurality of markers comprises an ArUco marker. In some embodiments, the rectifying of the image is based on more than four of the plurality of ArUco markers. In some embodiments, at least four different ArUco markers are utilized in the plurality of markers.

The operations 500 include, at block 510, obtaining an image generated by a client device, wherein the image comprises a photograph taken by the client device of a print-out of the marked electronic document. The client device may be, for example, a "smart" cellular phone having a camera (built-in or attached), a tablet device having a camera, (built-in or attached), a personal computer (PC) or laptop having a camera (built-in or attached), a camera (where its physically-produced photograph can be scanned by a scanner-type device or similar device having optical sensing/scanning capabilities, such as a cellular phone). A user may have obtained the marked electronic document—e.g., over a network, from a storage location, via an electronic message, etc.—and printed out the marked electronic document (e.g., using a printer onto paper). The user may then have used a client device to capture a photograph of the marked electronic document and may have possibly captured many different photographs of the marked electronic document (e.g., at different locations, lighting schemes, rotations/angles, times of day, and/or with different client devices).

The operations 500 include, at block 515, rectifying the image based on an identification of the plurality of visible markers. Block 515 may comprise detecting locations of the plurality of markers to determine a "skewed" orientation of the marked electronic document within the image, and applying one or more image transforms (e.g., rotation, resizing, color/brightness correction, cropping etc.) to create a rectified image that is laid out in a common format—e.g., sides are approximately vertical, the top and bottom are approximately horizontal, etc., that is extremely similar to the layout of the initial electronic document.

In some embodiments, the rectifying of the image comprises determining, based on the plurality of markers, a top side of the representation of the marked electronic document within the image.

In some embodiments, block 515 includes identifying the electronic document based on the identified plurality of visible markers from the image; and selecting the locations of the plurality of text elements and the identified text elements based on the identifying of the electronic document.

The operations 500 include, at block 520, automatically annotating the rectified image with the plurality of text elements based on the plurality of locations of the plurality of text elements. Block 520 may include associating ones of the plurality of text elements with corresponding locations within the rectified image as indicated by the plurality of locations.

Optionally, in some embodiments, the operations 500 further include automatically annotating a plurality of other rectified images based on a plurality of sets of locations and a plurality of sets of identified text elements, each of the plurality of sets of locations corresponding to a plurality of text elements of a corresponding electronic document; and storing the annotated rectified image and the annotated plurality of other rectified images at a storage location. Optionally, in some embodiments, the operations 500 further include providing the annotated rectified image and the annotated plurality of other rectified images to a machine learning (ML) engine to be used as training data for training a ML model.

Optionally, in some embodiments, the operations 500 further include projecting the locations of the plurality of text elements and the identified text elements back onto the image generated by the client device.

In some embodiments, each of the plurality of locations of text elements represented in the electronic document comprises a representation of a polygon such as a bounding box.

Optionally, in some embodiments, the operations 500 further include removing the plurality of markers from the obtained image to yield a cleaned image; and training a rectifier model used to rectify images based at least on the cleaned image.

Figure 6:
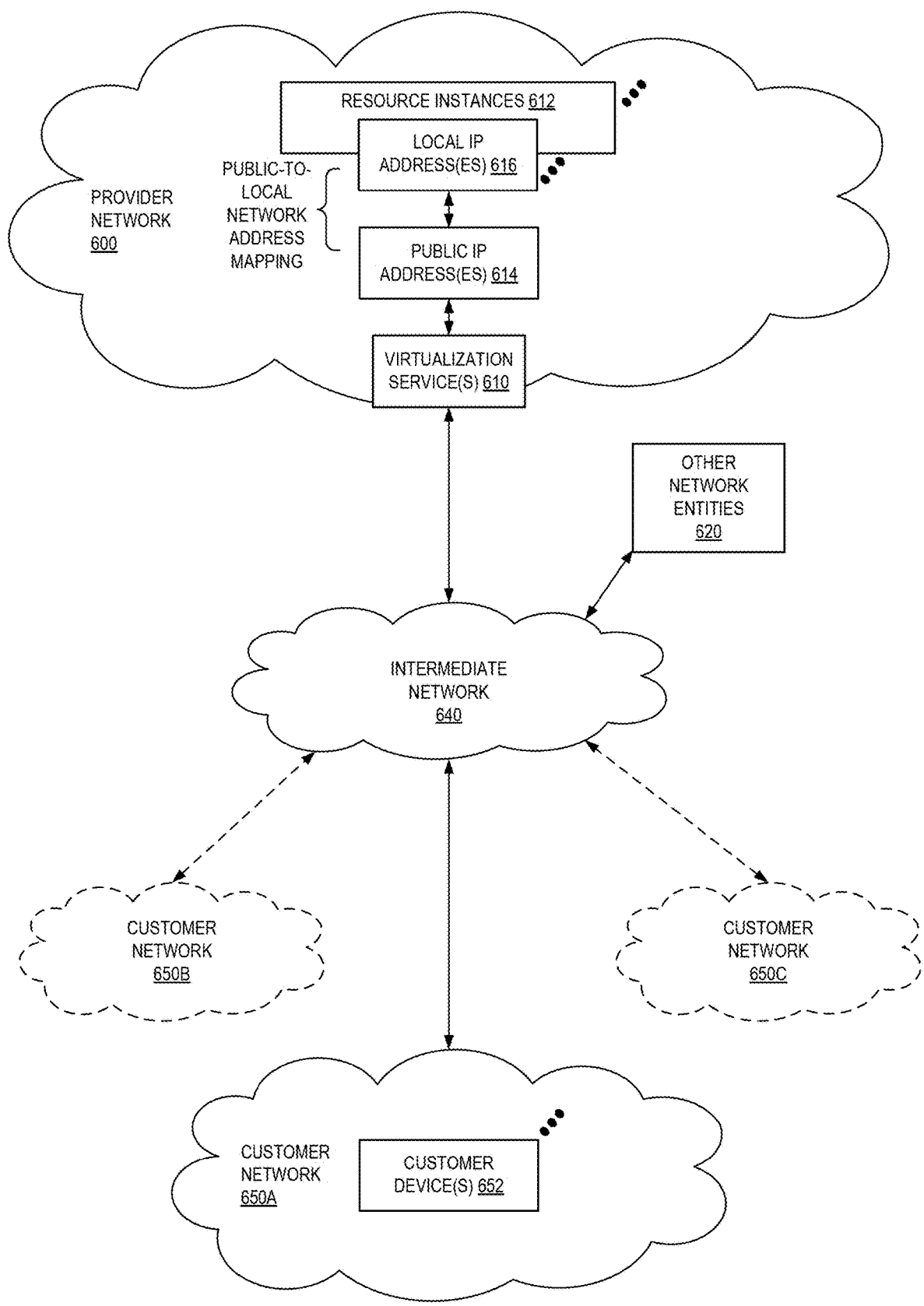
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
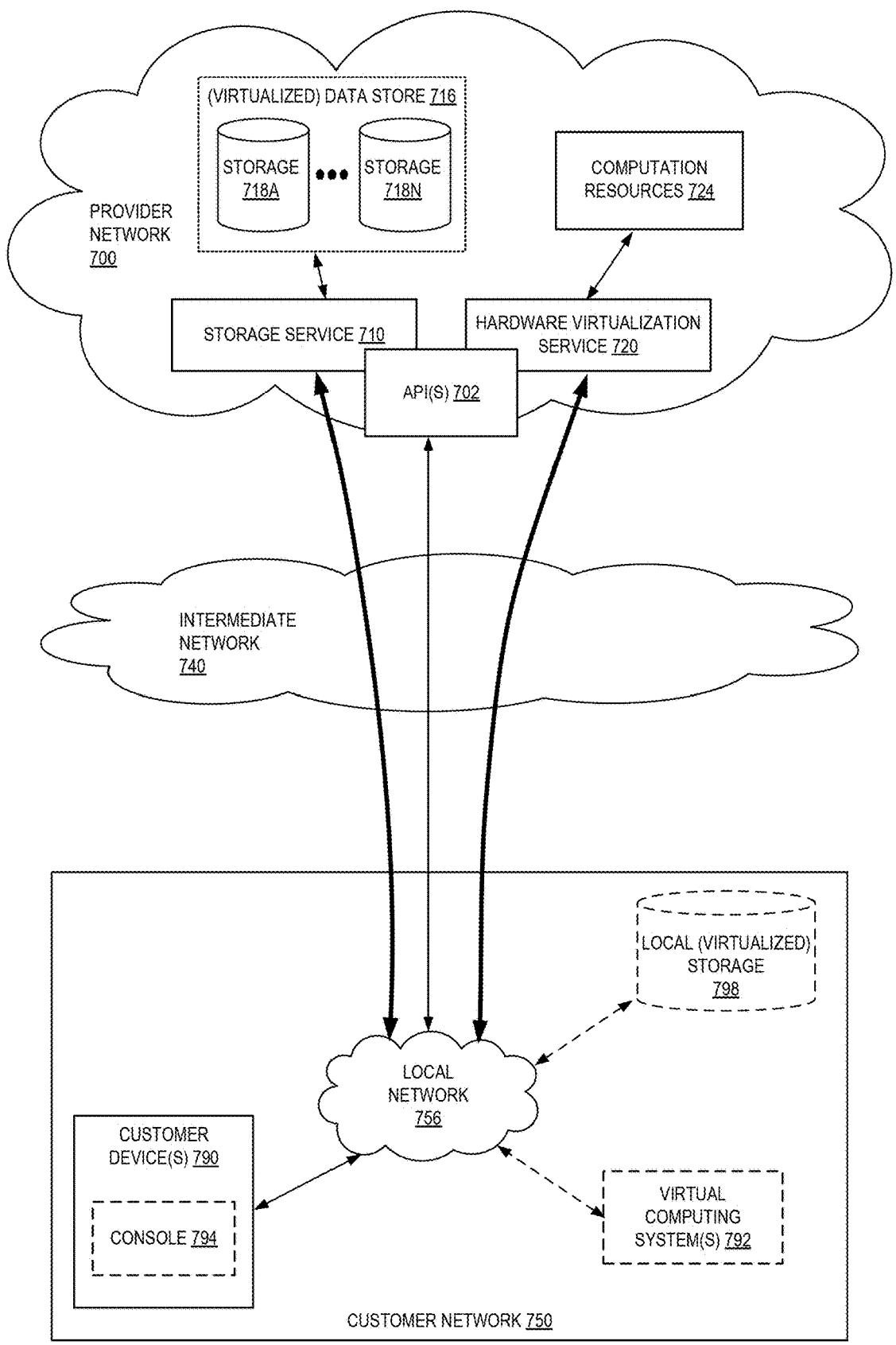
FIG. 7 is a block diagram of an example provider network that provides a storage service and a hardware virtualization service to customers according to some embodiments.

FIG. 7 is a block diagram of an example provider network that provides a storage service and a hardware virtualization service to customers, according to some embodiments. Hardware virtualization service 720 provides multiple computation resources 724 (e.g., VMs) to customers. The computation resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the computation resources 724 to public Internet destinations, and from public Internet sources to the local IP addresses of computation resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage service 710, for example via one or more APIs 702, to access data from and store data to storage resources 718A-718N of a virtual data store 716 (e.g., a folder or "bucket", a virtualized volume, a database, etc.) provided by the provider network 700. In some embodiments, a virtualized data store gateway (not shown) may be provided at the customer network 750 that may locally cache at least some data, for example frequently-accessed or critical data, and that may communicate with storage service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes via storage service 710 acting as a storage virtualization service, and these volumes may appear to the user as local (virtualized) storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Illustrative System

Figure 8:
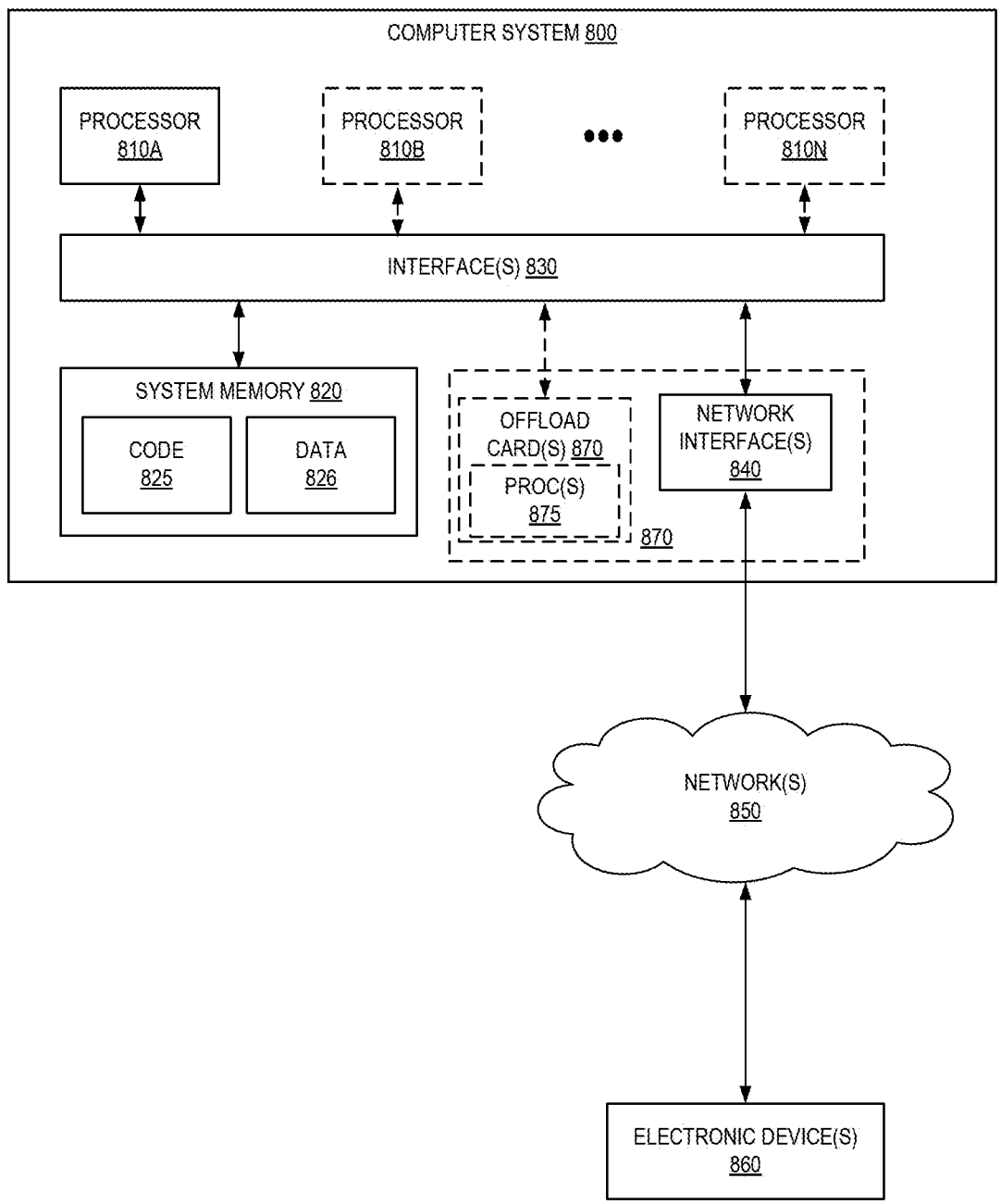
FIG. 8 is a block diagram illustrating an example computer system that may be used in some embodiments.

In some embodiments, a system that implements a portion or all of the techniques for the auto-generation of annotated real-world training data as described herein may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 820 as code 825 and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload cards 870 (including one or more processors 875, and possibly including the one or more network interfaces 840) that are connected using an I/O interface 830 (e.g., a bus implementing a version of the Peripheral Component Interconnect—Express (PCI-E) standard, or another interconnect such as a QuickPath interconnect (QPI) or UltraPath interconnect (UPI)). For example, in some embodiments the computer system 800 may act as a host electronic device (e.g., operating as part of a hardware virtualization service) that hosts compute instances, and the one or more offload cards 870 execute a virtualization manager that can manage compute instances that execute on the host electronic device. As an example, in some embodiments the offload card(s) 870 can perform compute instance management operations such as pausing and/or un-pausing compute instances, launching and/or terminating compute instances, performing memory transfer/copying operations, etc. These management operations may, in some embodiments, be performed by the offload card(s) 870 in coordination with a hypervisor (e.g., upon a request from a hypervisor) that is executed by the other processors 810A-810N of the computer system 800. However, in some embodiments the virtualization manager implemented by the offload card(s) 870 can accommodate requests from other entities (e.g., from compute instances themselves), and may not coordinate with (or service) any separate hypervisor.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Figure 9:
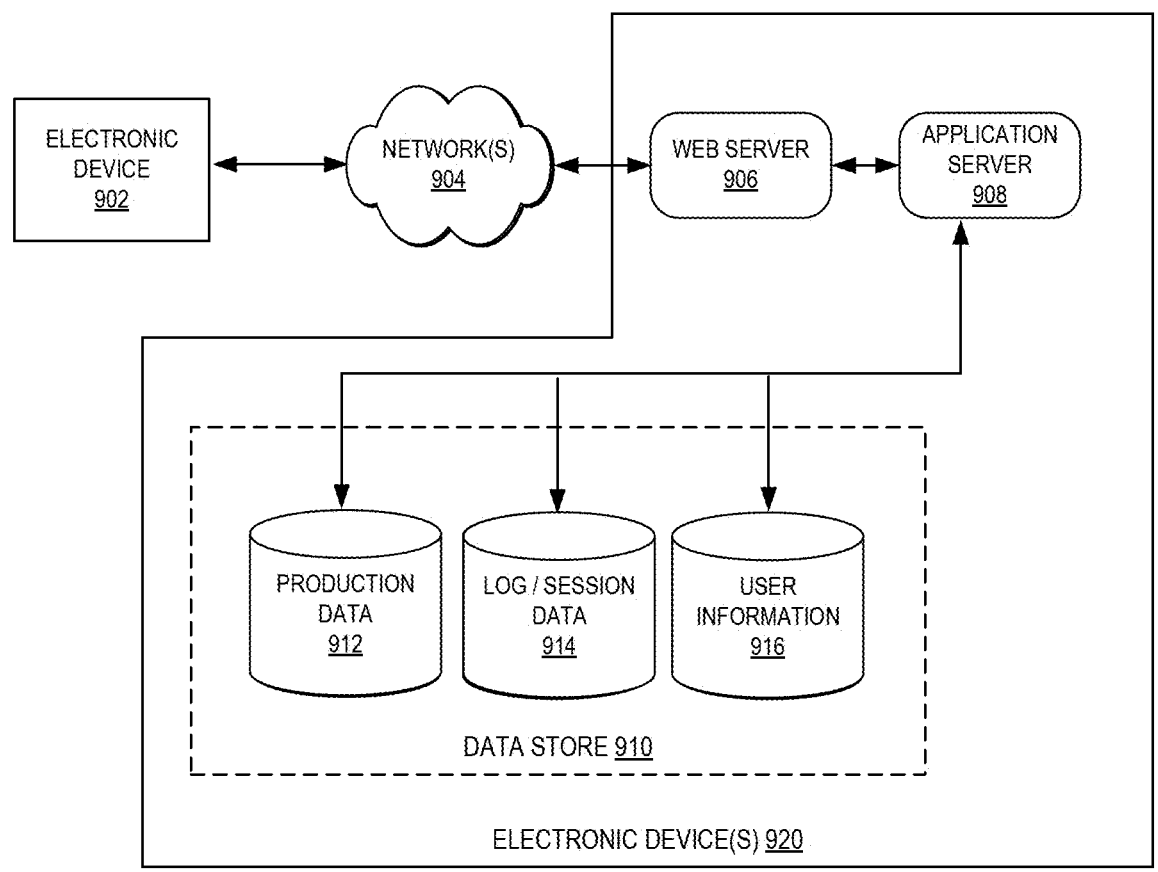
FIG. 9 illustrates an example of an environment for implementing aspects in accordance with various embodiments.

As discussed, different approaches can be implemented in various environments in accordance with the described embodiments. For example, FIG. 9 illustrates an example of an environment 900 for implementing aspects in accordance with various embodiments. For example, in some embodiments ones of the messages originated by the client devices 104 and passing through the intermediate networks 107 as shown in FIG. 3 are HyperText Transfer Protocol (HTTP) requests that are received by a web server (e.g., web server 906), and the users, via electronic devices, may interact with the provider network via a web portal provided via the web server 906 and application server 908. As will be appreciated, although a web-based environment is used for purposes of explanation, different environments may be used, as appropriate, to implement various embodiments. The system includes an electronic client device 902, which may also be referred to as a client device and can be any appropriate device operable to send and receive requests, messages or information over an appropriate network 904 and convey information back to a user of the device 902. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 904 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 904 includes the Internet, as the environment includes a web server 906 for receiving requests and serving content in response thereto, although for other networks an alternative device serving a similar purpose could be used, as would be apparent to one of ordinary skill in the art.

The illustrative environment includes at least one application server 908 and a data store 910. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server 908 can include any appropriate hardware and software for integrating with the data store 910 as needed to execute aspects of one or more applications for the client device 902 and handling a majority of the data access and business logic for an application. The application server 908 provides access control services in cooperation with the data store 910 and is able to generate content such as text, graphics, audio, video, etc., to be transferred to the client device 902, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 902 and the application server 908, can be handled by the web server 906. It should be understood that the web server 906 and application server 908 are not required and are merely example components, as structured code discussed herein can be executed on any appropriate device or host machine as discussed elsewhere herein.

The data store 910 can include several separate data tables, databases, or other data storage mechanisms and media for storing data relating to a particular aspect. For example, the data store illustrated includes mechanisms for storing production data 912 and user information 916, which can be used to serve content for the production side. The data store 910 also is shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update, or otherwise process data in response thereto. In one example, a user might submit a search request for a certain type of item. In this case, the data store 910 might access the user information 916 to verify the identity of the user and can access a production data 912 to obtain information about items of that type. The information can then be returned to the user, such as in a listing of results on a web page that the user is able to view via a browser on the user device 902. Information for a particular item of interest can be viewed in a dedicated page or window of the browser.

The web server 906, application server 908, and/or data store 910 may be implemented by one or more electronic devices 920, which can also be referred to as electronic server devices or server end stations, and may or may not be located in different geographic locations. Each of the one or more electronic devices 920 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the environment 900 in FIG. 9 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C #or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 215A-215N, 314A-314Z) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   identifying a plurality of text elements represented in an electronic document and a corresponding plurality of locations of the plurality of text elements;
   modifying a representation of the electronic document to include a plurality of markers, the modifying resulting in a marked electronic document;
   obtaining an image generated by a client device, wherein the image comprises a photograph taken by the client device of a print-out of the marked electronic document;
   rectifying the image based on an identification of the plurality of visible markers;
   automatically annotating the rectified image with the plurality of text elements based on the plurality of locations of the plurality of text elements to yield an annotated image; and
   projecting the locations of the plurality of text elements and the identified text elements back onto the image generated by the client device.

2. The computer-implemented method of claim 1, further comprising:
   automatically annotating a plurality of other rectified images based on a plurality of sets of locations and a plurality of sets of identified text elements to yield a plurality of annotated images, each of the plurality of sets of locations corresponding to a plurality of text elements of a corresponding electronic document; and
   storing the annotated image and the plurality of annotated images at a storage location.

3. The computer-implemented method of claim 2, further comprising:
   providing the annotated image and the plurality of annotated images to a machine learning (ML) engine to be used as training data for training a ML model.

4. The computer-implemented method of claim 1, further comprising:
   identifying the electronic document based on the identified plurality of visible markers from the image; and
   selecting the locations of the plurality of text elements and the identified text elements based on the identifying of the electronic document.

5. The computer-implemented method of claim 1, wherein at least one of the plurality of markers comprises an ArUco marker.

6. The computer-implemented method of claim 5, wherein the rectifying of the image is based on more than four of the plurality of markers.

7. The computer-implemented method of claim 5, wherein at least two different ArUco markers are utilized in the plurality of markers.

8. The computer-implemented method of claim 7, wherein the rectifying of the image comprises determining, based on the plurality of markers, a top side of the representation of the marked electronic document within the image.

9. The computer-implemented method of claim 1, wherein each of the plurality of locations of text elements represented in the electronic document comprises a representation of a polygon.

10. A system comprising:
    a storage service implemented by a first one or more electronic devices; and
    a machine learning service implemented by a second one or more electronic devices, the machine learning service including instructions that upon execution cause the machine learning service to:
    identify a plurality of text elements represented in an electronic document and a corresponding plurality of locations of the plurality of text elements,
    modify a representation of the electronic document to include a plurality of markers, the modifying resulting in a marked electronic document,
    obtain an image generated by a client device from the storage service, wherein the image comprises a photograph taken by the client device of a print-out of the marked electronic document,
    rectify the image based on an identification of the plurality of visible markers,
    automatically annotate the rectified image with the plurality of text elements based on the plurality of locations of the plurality of text elements to yield an annotated image,
    send the annotated image to the storage service to be stored at a storage location, and
    project the locations of the plurality of text elements and the identified text elements back onto the image generated by the client device.

11. The system of claim 10, wherein the instructions upon execution further cause the machine learning service to:
    automatically annotate a plurality of other rectified images based on a plurality of sets of locations and a plurality of sets of identified text elements to yield a plurality of annotated images, each of the plurality of sets of locations corresponding to a plurality of text elements of a corresponding electronic document; and
    send the plurality of annotated images to be stored at the storage location with the annotated image.

12. The system of claim 11, wherein the instructions upon execution further cause the machine learning service to:
    obtain a set of training data from the storage service, the set of training data comprising the annotated image and the plurality of annotated images; and
    provide the set of training data to a machine learning (ML) engine for training a ML model.

13. The system of claim 10, wherein the instructions upon execution further cause the machine learning service to:
    identify the electronic document based on the identified plurality of visible markers from the image; and select the locations of the plurality of text elements and the identified text elements based on the identifying of the electronic document.

14. The system of claim 10, wherein at least one of the plurality of markers comprises an ArUco marker.

15. The system of claim 10, wherein the machine learning service is configured to rectify the image based on more than four of the plurality of markers.

16. A computer-implemented method comprising:

identifying a plurality of text elements represented in an electronic document and a corresponding plurality of locations of the plurality of text elements;

modifying a representation of the electronic document to include a plurality of markers, the modifying resulting in a marked electronic document;

obtaining an image generated by a client device, wherein the image comprises a photograph taken by the client device of a print-out of the marked electronic document;

rectifying the image based on an identification of the plurality of visible markers;

automatically annotating the rectified image with the plurality of text elements based on the plurality of locations of the plurality of text elements to yield an annotated image; and removing the plurality of markers from the obtained image to yield a cleaned image for use in training a rectifier model used to rectify images.

17. The computer-implemented method of claim 16, further comprising:

identifying the electronic document based on the identified plurality of visible markers from the image; and selecting the locations of the plurality of text elements and the identified text elements based on the identifying of the electronic document.

18. The computer-implemented method of claim 16, wherein at least one of the plurality of markers comprises an ArUco marker.

19. The computer-implemented method of claim 18, wherein the rectifying of the image is based on more than four of the plurality of markers.

20. The computer-implemented method of claim 18, wherein at least two different ArUco markers are utilized in the plurality of markers.

\* \* \* \* \*